United States Patent [19]

Flores

[11] Patent Number: 4,678,613

[45] Date of Patent: Jul. 7, 1987

[54] PROCESS FOR THE PURIFICATION OF TRIPHENYLMETHANE COMPOUNDS

[75] Inventor: Robert J. Flores, Cincinnati, Ohio

[73] Assignee: PMC Specialties Group, Inc., Rocky River, Ohio

[21] Appl. No.: 452,679

[22] Filed: Dec. 23, 1982

Related U.S. Application Data

[62] Division of Ser. No. 328,899, Dec. 9, 1981, abandoned.

[51] Int. Cl.$^4$ ............................................. C09B 11/10
[52] U.S. Cl. ..................................................... 260/391
[58] Field of Search ......................................... 260/391

[56] References Cited

U.S. PATENT DOCUMENTS

| | | | |
|---|---|---|---|
| 2,422,445 | 6/1947 | Stryker et al. | 260/391 |
| 2,429,081 | 10/1947 | Steuber | 260/391 |
| 3,121,115 | 2/1964 | Meuly | 260/391 |
| 3,652,602 | 3/1972 | Schafer et al. | 260/391 |
| 3,671,553 | 6/1972 | Papenfuss et al. | 260/392 |
| 3,679,713 | 7/1972 | Feidman et al. | 260/388 |
| 3,925,094 | 12/1975 | Papenfuss et al. | 106/288 |
| 4,226,442 | 10/1980 | Carlson et al. | 282/27.5 |
| 4,238,130 | 12/1980 | Burri | 282/27.5 |
| 4,247,470 | 1/1981 | Hermann et al. | 260/391 |
| 4,272,292 | 6/1981 | Mizuno et al. | 106/22 |

OTHER PUBLICATIONS

The Chemistry of Synthetic Dyes and Pigments, edited by H. A. Lubs 1955, 274–289.

*Primary Examiner*—Richard L. Raymond
*Assistant Examiner*—Raymond K. Covington

[57] ABSTRACT

Triphenylmethane dyes are obtained in a purified or more concentrated condition which eliminates the excess aromatic amines and by-products obtained during the synthesis of the triphenylmethane dyes. These purified triphenylmethane dyes show special utility when used in combination with an electron acceptor (Lewis acid) to produce carbonless copy paper or when used as reactants in the manufacture of other dyes.

30 Claims, No Drawings

PROCESS FOR THE PURIFICATION OF TRIPHENYLMETHANE COMPOUNDS

This application is a division of application Ser. No. 328,899, filed 12/9/81 now abandoned.

BACKGROUND OF THE INVENTION

1. Field of the Invention

This invention relates to a process for purifying triphenylmethane compounds which are essentially water insoluble and which contain an aromatic primary amine as an impurity therein. This invention also relates to carbonless copy paper incorporating purified dye precursors, especially those which have been purified by the process of this invention.

2. Description of the Prior Art

Recording sheets of the type which undergo a change in color from a colorless state to a colored state by pressure have long bee known as pressure-sensitive or chemical carbonless copy paper (e.g. as disclosed in U.S. Pat. Nos. 2,711,375; 2,712,507; 2,730,456; 2,730,457; 3,418,250; 3,432,327; 3,955,025; 4,226,442; etc.). The use of electron donor dye precursors such as Crystal Violet Lactone and Michler's Hydrol paratoluene sulfinate in carbonless copy systems is also known in the art. None of the prior art teaching, however, discloses the use of the purified triphenylmethane compound of this invention as a dye precursor in pressure-sensitive copy paper.

The manufacture of water-insoluble triphenylmethane dyes can be accomplished by methods well known in the art, such as those representatively taught in U.S. Pat. Nos. 3,671,553 and 3,925,094. Therefore, the triphenylmethane dye precursors taught herein can be manufactured, for example, by the following representative methods:

1. By the reaction of rosanilines with primary aromatic amines in the presence of acid catalysts (especially benzoic acid), wherein an amine solution of the color bases is directly obtained (cf. Fierz-David, Kunstl. organische Farbstoffe 1926, page 262 and BIOS Final Report 1433, page 30 et seq.);

2. By the conversion of amine solutions of the color basetetrachloroaluminates, which can be obtained according to German Pat. Nos. 1,098,652, 1,161,370 and 1,161,371 or Belgian Pat. No. 718,410, by reacting 4,4',4"-trichlorotrityl or 4,4'-dichlorotrityl-tetrachlcroaluminates with primary aromatic amines, by means of aqueous alkali metal hydroxide solution into the amine solution of the free color bases. This produces the triphenylmethane compound as a solution in the remaining excess amine;

3. By the reaction of diphenyl amines with aromatic carboxylic acids or their functional derivatives (for example, benzotrihalides, anhydrides or acid halides) in the presence of acid catalysts and subsequent treatment with an aqueous alkali metal hydroxide, whereupon solutions of the color bases are obtained in the aromatic amine used in excess.

Typically, these dyes are utilized as the amine solution since the excess amine acts as a convenient solvent for the triphenylmethane product. There are difficulties inherent in the use of these impure materials, however. First, the intermediates and by-products formed during the manufacture of these compounds, as well as the aromatic amine, remain in the end product and thus reduce its tinctorial strength. Second, the aromatic amine which remains with the dye may constitute a health hazard due to its toxic nature. Third, the yield of products derived from the use of the triarylmethane compounds as reactants (e.g. to produce the monosulfonation products) is reduced due to the presence of the impurities. Fourth, surprisingly, it has now been found that the impurities and reaction by-products derived during the synthesis of these triphenylmethane compounds impart a characteristic which causes "blushing" or premature color development when unpurified dye precursosrs are utilized in carbonless copy paper.

No completely satisfactory method of purification yielding the dye in its carbinol form has been described in the prior art. The triphenylmethane compounds involved in this invention are essentially insoluble in aqueous media in both their carbinol and salt forms. As such, one cannot purify the products to remove the amine and other impurities by slurrying the salt form of the dye in the presence of aqueous caustic and heating to obtain the 100% carbinol form. That obvious route does not go in high yield probably due to the formation of a layer of the insoluble cabinol form of the dye on the surface of the amorphous salt which prevents further reaction.

U.S. Pat. No. 3,679,713 teaches a method of purifying water-soluble basic triphenylmethane dyes, but does not specifically teach a process for those triphenylmethane dyes which are water insoluble in both their salt and carbinol form. This patent teaches purification by mixing the water-soluble salt of the dye with a water immiscible solvent and an inorganic base to produce a solvent solution of the color base from which the purified salt can be extracted or precipitated after reacting the color base with an acid.

U.S. Pat. No. 3,652,602 teaches a method of purification which involves separation of the mineral acid salts of the dyes, followed by generation of the carbinol bases by reaction with aqueous alkali hydroxide in an excess of aromatic amine. The aromatic amine can then be distilled off to produce the carbinol base. This process is not totally effective, and it has proven impossible to remove all of the aromatic amine unless such stringent conditions are used which result in partial degradation of the desired carbinol base product.

U.S. Pat. No. 3,671,553 teaches purification of triphenylmethane dyes by treating the amine solution of the dye with excess aqueous sulfuric acid (optionally in the presence of a solvent), filtering the suspension, and distilling off water azeotropically to isolate the color base sulfate.

This invention overcomes the limitations of the prior art by removing the carbinol form of the triphenylmethane dye from the surface of the salt form by subjecting the carbinol form of the dye to temperature higher than about 100° C. under increased pressure so that the carbinol form of the dye can "melt" off the surface of the salt, or alternatively, by generating the carbinol form of the dye in the presence of an organic solvent which is capable of dissolving the dye in its carbinol form.

The triarylmethane or triphenylmethane dyes purified by this invention have special utility when used as reactants for the production of other dyes (e.g. by monosulfonation) or when used as dye precursors in carbonless copy paper.

SUMMARY OF THE INVENTION

This invention relates to pressure-sensitive carbonless copy media. In particular, in pressure-sensitive carbonless copy media having a first sheet in contiguous interfacial relation with a second sheet wherein said first sheet comprises a planar sheet material having coated thereon a substantially colorless dye precursor which is encapsulated or dispersed in a pressure-sensitive coating and wherein said second sheet comprises a planar sheet material having coated thereon an electron accepting material whereby the application of pressure effects a rupture of the capsular elements or coating in the area of applied pressure to effect a co-reacting and color-producing relationship between the dye precursor and the electron accepting material, the improvement which comprises utilizing as a dye precursor a purified triphenylmethane compound in its carbinol form wherein said compound is substantially free of aromatic amine and other impurities and wherein said compound in its carbinol form has the following general structural formula:

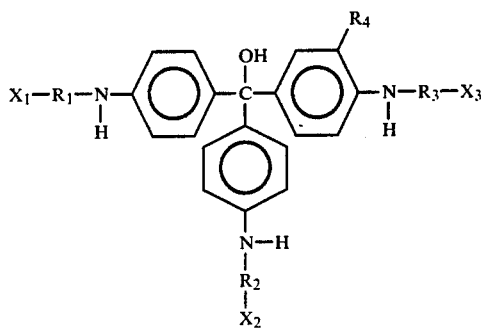

wherein $R_1$, $R_2$ and $R_3$ are direct linkages, phenyl, or naphthyl groups; $R_4$ is hydrogen or methyl; $X_1$, $X_2$ and $X_3$ are hydrogen, halogen, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

Furthermore, this invention relates to a novel process for removing aromatic amines and other contaminants from crude triphenylmethane compounds which comprises:

(1) Heating a crude triphenylmethane compound in it carbinol form in the presence of aqueous acid at an effective temperature to form the acid salt; and (2) Separating the salt from the aqueous acid solution; and (3) Washing the salt with water to remove water-soluble impurities; and (4) Heating the salt in the presence of an aqueous base at temperatures above about 100° C. and at pressures above atmospheric to produce the triphenylmethane compound in its carbinol form; and (5) Separating the purified triphenylmethane compound in its carbinol form from the aqueous base solution.

The crude triphenylmethane compounds can also be purified by a process which comprises:

(1) Heating the crude triphenylmethane compound in its carbinol form in the presence of aqueous acid at an effective temperature to form the acid salt; and (2) Separating the salt from the aqueous acid solution; and (3) Washing the salt with water to remove water-soluble impurities; and (4) Heating the salt at an effective temperature in the presence of an aqueous base and an effective amount of an organic solvent capable of dissolving the triphenylmethane compound in its carbinol form thereby producing a solvent solution of the purified triphenylmethane compound in its carbinol form; and (5) Separating the solution of the purified triphenylmethane compound in its carbinol form from the aqueous base solution.

The purified products of this invention will typically contain less than about 0.1% aromatic amine. It is an object of this invention to provide a process for the purification of triphenylmethane compounds which are essentially water insoluble in both their salt and carbinol forms. It is an object of this invention to provide a process for the purification of crude triphenylmethane compounds. More particularly, it is an object of this invention to provide a process for removing contaminants including aromatic amines from crude triphenylmethane compounds. It is a further object of this invention to prepare a dye precursor especially suited for use in pressure-sensitive copy paper. These and other objects of this invention will be apparent from the following description.

As used herein, the term "triphenylmethane compound" refers to the water-insoluble compounds of the following general formula:

Carbinol Form

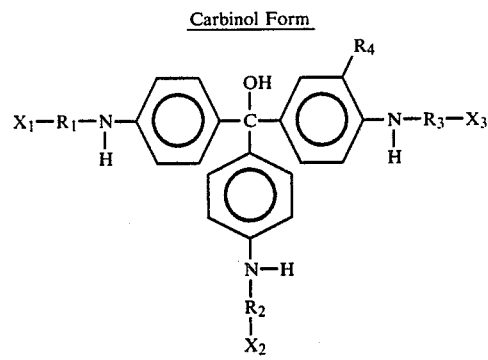

or its corresponding water-insoluble Salt Form (representatively displayed in one of its resonance structures):

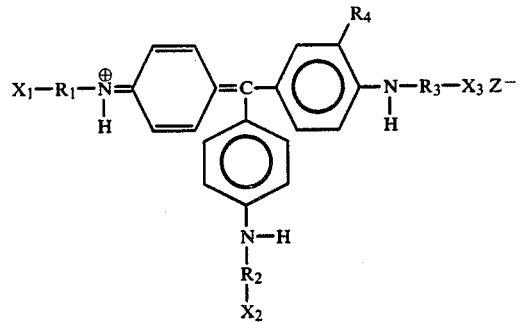

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, alkyl of 1 to 4 carbons or alkoxy of 1 to 4 carbons; and Z is an anion obtained by removing a hydrogen atom from an organic or inorganic acid; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

As used herein, the term "crude triphenylmethane compounds" refers to triphenylmethane compounds having the structure defined above and which are prepared by any conventional means involving reaction with an aromatic amine and wherein the excess aromatic amine remains as a "solvent" or an impurity in the dye product. The crude triphenylmethane compounds will often also contain by-products and other impurities as a result of their synthesis.

Although many of the uses for these triphenylmethane compounds, such as their use as dyestuffs or as precursors for other dyes and pigments, is not seriously affected by the presence of the primary aromatic amine, there are occasions when it would be preferred to use the pure compound free from contamination by the aromatic primary amine or other impurities. The invention described herein teaches a procedure for eliminating the primary amine and the other impurities. Surprisingly, it has been found that the impurities and reaction by-products derived during the synthesis of the triphenylmethane compounds impart a characteristic which causes "blushing" or premature color development when crude triphenylmethane compounds are utilized in carbonless copy paper. The purification processes taught herein eliminates these impurities and eliminates the problem of blusing. Without this purification the triphenylmethane compounds would not be as useful in carbonless copy systems as dye precursors. The removal of the primary aromatic amines also minimizes any health risk to a user of the purified product.

One of the typical methods of preparing the triphenylmethane compounds involves heating pararosaniline or rosaniline and an excess of an aromatic primary amine in the presence of acid. This process invariably leaves some impurities such as the acid and the aromatic primary amine and a small amount of by-products. The most common aromatic amines which are used in the production of the rosaniline and pararosaniline based triphenylmethane compounds are aniline, the toluidines, xylidines, halogenoanilines and halogenotoluidines and naphthylamines. The compound of the most commercial importance for the production of carbonless copy paper appears to be the reaction product of pararosaniline in an excess of aniline to produce the tris(4-anilinophenyl)-carbinol or its corresponding salt (for example, the hydrochloric acid salt tris (4-anilinophenyl)-carbenium chloride).

The chemistry involved in the use of these dye precursors is shown representatively for tris(4-anilinophenyl)-carbinol and its chloride salt tris(4-anilinophenyl)-carbenium chloride:

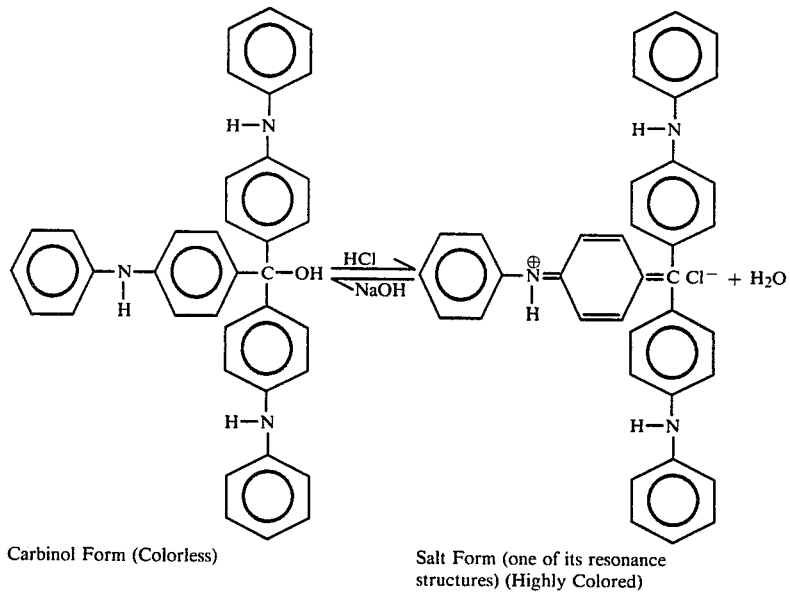

Carbinol Form (Colorless)     Salt Form (one of its resonance structures) (Highly Colored)

The triphenylmethane compounds containing an aromatic primary amine as an impurity therein have long been known in the prior art, and the exact method of their manufacture is not a critical element of this invention. The process taught herein for purifying the triphenylmethane compounds can be used on any of these materials derived by conventional means and which contain an aromatic primary amine as an impurity or a solvent therein.

DETAILED DESCRIPTION OF THE INVENTION

The purified triphenylmethane compounds of this invention can be prepared by a process which utilizes a solvent to dissolve the carbinol triphenylmethane compound as it's formed, or by a process which involves generating the carbinol form of the triphenylmethane compound at a temperature which is high enough to melt the carbinol triphenylmethane compound.

The initial steps of the process for removing the aromatic amines and other contaminants from the crude triphenylmethane compound involve heating the crude triphenylmethane compound in its carbinol form in the presence of aqueous acid at an effective temperature to form the acid salt and then separating the salt from the aqueous solution. It is preferred to allow the solution to cool slowly before separating the salt to ensure the best yield of product.

The acid should be present in an amount of at least about 0.8 equivalents of acid for each equivalent of triphenylmethane compound in its carbinol form. The preferred range is from about 1.0 to about 3.0 equivalents acid for each equivalent of triphenylmethane compound in its carbinol form, and especially preferred is about 1.2 to about 1.5 equivalents of acid for each equivalent of triphenylmethane in its carbinol form.

Any aqueous acid could be used to generate the salt, however due to their low cost and effectiveness, mineral acids are especially preferred in the practice of this invention. In particular, hydrochloric acid, sulfuric acid and nitric acid have shown special utility.

Effective temperatures for forming the acid salt range from about 75° C. up to reflux temperatures. Reflux temperatures are especially preferred.

Since the salt is essentially water insoluble, it can be separated from the aqueous solution by a variety of separatory techniques well known in the art, such as decantation, or, preferably, by filtering the solid salt product from the aqueous acid solution, and washing the presscake with water to remove the water-soluble impurities. The presscake can be used as is or dried.

The triphenylmethane salt is useless as a dye precursor in carbonless copy paper since it must be converted back to the carbinol form to have utility for this use. The salt cannot be merely heated in the presence of aqueous base to regenerate the carbinol form of the triphenylmethane compound, apparently because an insoluble layer of the carbinol form forms on the surface of the salt agglomerations thereby preventing further reaction.

In one of its aspects, this invention overcomes that drawback by heating the salt at an effective temperature of about 75° C. or higher in the presence of an aqueous base and an effective amount of an organic solvent capable of dissolving the triphenylmethane compound in its carbinol form and then subsequently separating the solution of the triphenylmethane compound in its carbinol form from the aqueous base.

The aqueous base should be present at a level of at least about 0.8 equivalents of base for each equivalent of salt. Especially preferred is a range of about 1.2 to about 3 equivalents of base for each equivalent of salt. It is especially preferred to heat the reaction mixture to reflux temperatures. Aqueous bases which are especially useful in the practice of this invention are the alkali metal hydroxides, and especially sodium hydroxide and potassium hydroxide.

As used herein, the term "organic solvent capable of dissolving a triphenylmethane compound in its carbinol form" means those chemically neutral or basic solvents which are stable in aqueous base at the reaction temperatures of 75° C. or higher and which are capable of dissolving at least about 1 part of carbinol triphenylmethane compound and preferably at least 10 parts in 100 parts of solvent at a temperature of 75° C.

Effective amounts of these solvents are those amounts necessary to solubilize the carbinol triphenylmethane formed, thereby ensuring substantially complete reaction of the acid salt and the aqueous base. Typically, these effective amounts will be at least 0.1 parts by weight solvent for each part by weight acid salt. The amount of solvent could range up to about 30 parts by weight or more for every part by weight salt. Especially preferred is a range of about 1 to 20 parts by weight solvent for every part by weight of salt.

The organic solvents useful in the practice of this invention include as representative examples hydrocarbons, ketones, amines, and esters. It is preferred that the organic solvent have low polarity because high polarity solvents can lead to premature color development.

Useful hydrocarbons include the aromatics such as benzene, toluene, xylene, ethyl benzene and the like.

Useful ketones include methyl n-propyl ketone, methyl isopropyl ketone, methyl isobutyl ketone, methyl isoamyl ketone, ethyl amyl ketone, cyclohexanone, isophorone and the like.

Useful amines include amines other than aromatic amines where the amine group is attached directly to the aromatic ring. Preferred amines include the primary amines such as ethylenediamine, tetramethylene diamine, benzylamine, 2-ethyl-n-butylamine, and the like; secondary amines such as piperidine, piperazine, 2-(N-methylamino) heptone and the like; tertiary amines such as triethylamine, triisopropyl amine and the like; heterocyclic aromatic amines such as pyridine, pyrimidine, quinoline, pyrols, etc. Also useful are the primary, secondary and tertiary amines having long chain alkyl groups derived from fatty acids. Representative examples of these amines are marketed by Armak Chemicals Division under the trademark ARMEEN.

Especially preferred of all the solvents are the aromatic hydrocarbons and pyridine.

The triphenylmethane compound in its carbinol form can be conveniently separated from the aqueous base merely by separating the solvent solution from the aqueous phase by decantation, filtration or other separatory technique if the solvent is insoluble in water, or if the solvent is water soluble by extraction of the carbinol triphenylmethane compound into a water insoluble solvent or alternatively by evaporating the solution to dryness. Once the solvent solution of triphenylmethane compound in its carbinol form is obtained, it can be used as is or it can be evaporated to dryness (by well-known techniques such as vacuum or steam distillation) leaving the purified solid triphenylmethane compound in its carbinol form.

The purification process of this invention is especially preferred for the purification of tris(4-anilinophenyl)-carbinol, as this compound shows excellent commercial utility in carbonless copy paper.

An alternative method for removing the carbinol form of the triphenylmethane compound from the surface of the crystals of the salt is to maintain the temperature while heating the salt in the presence of an aqueous base at temperatures above about 100° C. and at pressures above atmospheric. At this temperature range the triphenylmethane in its carbinol form will melt off of the surface of the salt and it is not necessary to utilize a solvent to drive the reaction to completion. It is preferred to maintain this temperature between 100° and 200° C. and it is especially preferred to maintain it between about 100° and 165° C. The pressure should be maintained at levels above atmospheric pressure to prevent the evaporation of the aqueous solution. The preferred range of pressures is from about atmospheric pressure up to about 150 psi or higher. The aqueous base should be present in the same range defined earlier.

Once the reaction of the salt and aqueous base at these temperatures and pressures is completed, the carbinol form of the triphenylmethane compound can be separated from the aqueous solution by filtration or by any conventional means such as extraction into a solvent.

In any of the variations of this invention, the methods of separation are not critical to the practice of this invention and any conventional separatory technique can be utilized.

The purified triphenylmethane compounds of this invention show special utility in carbonless copy paper. Crude triphenylmethane compounds are not acceptable for this use because they show premature color development and blushing and are especially sensitive to heat and high humidity. These problems are apparently related to by-products formed during the manufacture of the crude triphenylmethane compound. Furthermore, for health and safety reasons it is desirable to minimize exposure to aromatic amines. Use of the purified trihenylmethane compounds of this invention eliminates all of these problems in carbonless copy paper.

Pressure sensitive or so called "chemical carbonless" copy systems broadly comprise a substrate supported coating that contains a first normally inactive chemical reagent material that is selectively transferrable in response to applied pressure into a reaction providing and color producing relationship with a second normally inactive chemical reagent material contained within or comprising a second coating disposed on the surface of an interfacially contiguous second substrate. Conventionally illustrative of such chemical type reproduction systems are transfer and duplicating systems wherein the rear surface on one paper sheet substrate is provided with a coating and which sheet is then termed a "CB" (i.e. coated back) sheet and the front side of that same and/or separate paper sheet substrate is provided with a coating which is then termed a "CFB" (i.e. coated front and back) or "CF" (i.e. coated front) sheet, respectively. When the coatings on a CB and a CF sheet are placed in interfacially contiguous relation and subjected to selectively applied pressure, as by the pressure of a stylus or the impact of a typewriter key on the obverse surface of the CB sheet, the operative and usually colorless chemial reagents in such coatings are brought into co-reactive relationship, as for example on the surface of the CF sheet, to produce a colored image conforming to the contour of the selectively applied pressure member.

In the system at hand, one of the normally inactive chemical reagent materials would be the purified triphenylmethane compound in its carbinol form, and the other normally inactive chemical reagent material would be an electron accepting material. U.S. Pat. Nos. 2,712,507; 2,730,456; and 3,455,721 illustratively disclose the use of encapsulated dye precursor materials in the CB coating and electron accepting materials as the chromagenic reagent in the CF coating. U.S. Pat. Nos. 3,787,325 and 3,894,168 illustratively disclose the disposition of the dye precursor material in the CF coating and the encapsulated electron accepting material in the CB coating.

For the purpose of this invention, the term "electron accepting material" means any acidic material within the definition of a Lewis acid. The electron accepting material can be a polymer, a pigment, or other materials well known in the chemical carbonless copy paper art.

Acidic organic polymeric materials known in the art, which are useful for developing the color of the purified triphenylmethane compound in this invention include phenolic polymers, phenol-formaldehyde polymers, acrylic polymers containing free carboxylic acids, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinylmethylethermaleic anhydride copolymers and mixtures thereof.

More specifically, phenolic polymers found useful include alkyl-phenol acetylene resins, "novolacs" (a type of phenolformaldehyde polymeric material), and resol resins.

Illustrative examples of electron accepting pigments and materials which are useful in the practice of this invention include the acid claylike materials such as acid clays, active clays, attapulgite, or zeolite materials such as sodium aluminum silicate materials or such in which the sodium has been exchanged for hydrogen or some other metal ion as disclosed in U.S. Pat. Nos. 2,581,186 and 2,641,557.

Other solid materials which are useful as the electron accepting material include organic acids such as aromatic carboxy compounds (e.g. salicylic acid, etc.), organic hydroxy compounds (e.g. p-t-butylphenol, p-t-amylphenol, o-chlorophenol, m-chlorophenol, p-chlorophenol, and metal salts thereof (e.g., the zinc salt, etc.). Suitable color developers are described also in U.S. Pat. Nos. 2,501,331; 3,669,711; 3,427,180; 3,455,721; 3,516,845; 3,634,121; 3,672,935; 3,732,120 as well as elsewhere in the patent and technical literature.

Either the dye precursor or the electron accepting material can be, if desired, encapsulated in pressure sensitive capsules or can be dispersed in a coating, or in the case of the electron accepting material, could be the coating itself. The encapsulation technique is well known in the art and can be performed by the procedures described, for example, in U.S. Pat. No. 2,712,507; 2,730,457, 2,800,457, 2,800,458; (reissued as U.S. Pat. No. Re. 24,899) and 3,041,289. Preferred examples of eligible capsule wall materials include gelatin, gum arabic, agar-agar and many others thoroughly described in the aformentioned patents.

The dye precursors could also be dispersed in a pressure sensitive hydrophobic binder material. The hydrophobic resins include polyvinylbutyral, polyvinylacetal, and polyvinylformal resins. More specifically, suitable polyvinylbutyrals comprise the Butvar polyvinylbutyral resins which are manufactured by Monsanto Polymers and Petrochemicals Company and a preferred resin is Butvar B-98. Such Butvar B-98 have an average molecular weight of about 30,000 to 34,000; a hydroxyl content, expressed as percent polyvinyl alcohol, of 18 to 20; an acetate content, expressed as percent polyvinylacetate, of 0 to 2.5; and a butyal content, expressed as percent polyvinylbutyral, of about 80.

As used herein, the term "encapsulated dye precursor" is intended to include a dye precursor which is encapsulated in pressure-sensitive capsules or a dye precursor which is dispersed in a pressure-sensitive binder material.

If desired, the purified triphenylmethane dye precursor can be utilized in combination with additional dyes and/or pigments.

Pigments which have special utility as opacifier-fillers include the water-insoluble and approximately chemically neutral pigments such as calcium carbonate, barium sulfate, titanium dioxide, magnesium carbonate, and other materials known in the art. It is preferred that the approximately chemically neutral pigments be slightly basic rather than slightly acidic because acidic pigments tend to develop the color of the dye precursor materials prior to use.

Additional dyes which are reactive with the electron acceptor materials and which could be used in combination with the purified triphenylmethane compounds taught in this invention include the other triarylmethane compounds, as well as the diarylmethane compounds, xanthene compounds, thiazine compounds, spiropyran compounds, and other materials well known in the art. Specific examples of color formers which are suitable include, the triphenylmethane compounds such as 3,3-bis(p-dimethylaminophenyl)-6-dimethylaminophthalide, i.e., crystal violet lactone, 3,3-bis(p-dimethylaminophenyl)phthalide, 3-(p-dimethylaminophenyl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-6-dimethylainophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide, 3-p-dimethylaminophenyl-3-(1-methylpyrrol-2-yl)-6-dimethylaminophthalide, etc..

Illustrative diphenylmethane compounds are 4,4'-bis-dimethylaminobenzhydrin benzyl ether, N-halophenyl-leucoauramine, N-2,4,5-trichlorophenyl-leucoauramine, etc.

Examples of xanthene compounds are rhodamine-B-anilinolactam, rhodamine-(p-nitroanilino)lactam, rhodamine-B-(p-chloroanilino)lactam, 7-dimethylamino-2-methoxyfluoran, 7-diethylamino-2-methoxyfluoran, 7-diethylamino-3-chloro-2-methyl-fluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, etc.

Suitable examples of thiazine compounds are benzoylleucomethylene, blue, p-nitrobenzylleucomethylene blue, etc.

Spiro compounds include 3-methyl-spiro-dinaphthopyrar 3-ethyl-spiro-dinaphthopyran, 3,3'-dichlorospiro-dinaphthopyran, 3-benzyl-spiro-dinaphthopyran, 3-methylnaphtho(3-methoxybenzo)spiropyran, 3-propyl-spiro-dibenzodipyran, etc.

One or more of the above-illustrated color formers can be appropriately selected and be used in combination with the purified triphenylmethane compound of this invention. Use of these additional dyes in combination with the purified carbinol form of the triphenylmethane compound enables the formulator to produce dyes of various colors. For example, the combination of about 36.5% tris(4-anilinophenyl)-carbinol, 40.5% Basic Yellow 37 and 13.0% Basic Red 14 produces an excellent, opaque black dye.

Suitable supports which can be used in the practice of this invention include plastic films, paper, resin-coated paper, synthetic papers, and the like.

The following examples are intended to illustrate the invention, but are not presented as limitations upon the scope of the claims. As used in these examples the crude triphenylmethane compound was prepared according to the general method described in Kunstl. organishe Farbstoffe 1926, page 262 and BIOS Final Report 1433, page 30 et seq. and involved the reaction of pararosaniline and excess aniline in the presence of benzoic acid catalyst to produce an aniline solution of tris(4-anilinophenyl)-carbinol as the crude triphenylmethane compound.

EXAMPLE 1

A five liter, 3 neck flask is fitted with a stirrer, reflux condenser, and a heating mantle. The flask was charged with 3,500 milliliters water, 400 grams crude carbinol triphenylmethane compound and 70 milliliters concentrated reagent hydrochloric acid (83.3 grams 36% HCL). The crude carbinol triphenylmethane compound was about 88% tris(4-anilinophenyl)-carbinol with the major contaminants being aniline, diethylene glycol, and sodium benzoate. This mixture was refluxed with stirring for ten hours and then filtered without cooling through an 18.5 cm Buchner funnel. The filtered product was washed to a total wash volume of 18 liters of hot water, to produce approximately 522 grams of a wet cake of the chloride salt having approximately 72.0% dry content (yield was about 376 grams of product on a dry basis).

Two hundred sixty one grams of the wet filter cake (188 grams on a dry basis), 800 milliliters water, and 35 grams 50% sodium hydroxide were charged into a five liter, three neck flask fitted with stirrer, reflux condenser and heating mantle. The mixture was stirred, heated to reflux an held at reflux temperatures for about one hour. Eight hundred milliliters of toluene was carefully added to the mixture. (This addition must be done carefully because the reaction mixture is at a temperature of approximately 99° C. which is greater than the temperature of the toluene-water azeotrope of 84° C. Alternatively, the batch could be cooled to a lower temperature prior to the addition of the toluene.) The reaction mixture is then refluxed for an additional six hours. After the six-hour period an additional 2,169 milliliters of toluene was added and the refluxing continued for two more hours. The split addition of toluene is useful to insure good stirring and good admixture for each of the toluene additions.

The reaction mixture was then allowed to cool to room temperature and filtered through a polypropylene 100 micron filter into a five liter separatory funnel. The waterlayer was discarded, and the toluene layer containing the purified tris(4-anilinophenyl)-carbinol was analyzed by a UV spectrophotometer indicating an approximate 6% solution of tris(4-anilinophenyl)-carbinol in toluene, essentially free from aniline, undesirable by-products and other contaminants.

This solution can be used as is, or the toluene can be removed and the dried purified carbinol product can be used.

The purified product shows special utility in carbonless copy paper formulations.

EXAMPLE 2

A three liter, three neck flask fitted with stirrer, reflux condenser and heating mantle was charged with 200 grams of the crude triphenylmethane compound, 200 milliliters water and 35 milliliters concentrated hydrochloric acid. The crude triphenylmethane compound was approximately 85% tris(4-anilinophenyl)-carbinol with the remaining 15% being aniline, sodium benzoate and lesser amounts of other impurities and by-products. The mixture was stirred and refluxed for approximately 18 hours. The reaction mixture was filtered while still hot, and washed with hot water until the test for chloride ion (silver nitrate solution) in the effluent was no longer positive. The product was dried at 70° C. to yield 183.3 grams of the dry, purified chloride salt.

The three liter flask equipped as described above was charged with the 183.3 grams of the dry chloride salt, and 400 grams (427 milliliters) pyridine. This mixture was stirred and a solution of 35 grams 50% sodium hydroxide in 400 milliliters of water was added. The mixture was refluxed and stirred for 3½ hours and then allowed to cool overnight. After standing, the mixture was combined with 2,000 milliliters of water, mixed, and the aqueous layer decanted off. The remaining product was washed by decantation with two additional 1,500 milliliter water additions. The mixture was washed with additional water until the mass was mostly solidified. The total water wash was approximately 12 liters. This mass was returned to the three liter, three neck flask, mixed with additional water, and steam distilled until the pyridine odor was absent from the distillate. The remaining water was decanted from the product and the product dried at 50° C. The product was approximately 169.5 grams of dry tris(4-anilinophenyl)-carbinol, essentially free from impurities.

EXAMPLE 3

A one liter, three neck flask equipped with stirrer, reflux condenser and heating mantle was charged with 200 milliliters water, 7.8 grams 50% sodium hydroxide, and 40.0 grams of dry, purified chloride salt prepared in the manner described in Example 2 by refluxing the crude triphenylmethane compound in aqueous mineral acid. This mixture was stirred, heated, and maintained at reflux temperatures for one hour. Two hundred milliliters of methyl iso-butyl ketone was added and refluxed for six more hours. An additional charge of 240 milliliters iso-butyl ketone was made and reflux continued for two more hours. After this time period, an additional 100 milliliters methyl iso-butyl ketone was added, and the mixture was allowed to cool to room temperature. The aqueous layer was decanted, and the methyl iso-butyl ketone layer containing the tris(4-aninilinophenyl)-carbinol was washed several times with additional water which was then decanted. If desired, the methyl iso-butyl ketone can be evaporated to leave a dry, solid carbinol product. The purified carbinol product was an excellent dye precursor when used in carbonless copy systems.

EXAMPLE 4

A 500 milliliter three neck flask equipped with stirrer, reflux condenser and heating mantle was charged with 250 milliliters water, 8.75 grams 50% sodium hydroxide, 11.5 grams Armeen C (high molecular weight aliphatic coco-amine manufactured by Armour Industrial Chemical Company having a major component $C_{12}H_{25}NH_2$, an amine number of about 267, and which is derived by conversion of the coconut fatty acid nitrile to the primary fatty amine by catalytic hydrogenation), and 47 grams dry chloride salt prepared as described in Example 2 by refluxing the crude triphenylmethane compound in aqueous hydrochloric acid. The mixture was stirred and refluxed for approximately 20 hours. The water layer was decanted, and the solid carbinol product was ground and then slurried in 300 milliliters water, filtered and washed with 500 milliliters water. The carbinol product was dried at 50° C. for about 3½ days. The product was tris(4-aninilinophenyl)-carbinol essentially free from aniline and undesirable impurities. The total yield of dry product was approximately 55.5 grams.

EXAMPLE 5

A pressure kettle equipped with stirrer, thermometer, and pressure gauge was charged with 124.5 grams of the wet cake of chloride salt prepared as described in Example 1, five hundred milliliters water and 17.5 grams 50% sodium hydroxide. The pressure kettle was bolted shut and heated to 100° C. over about a 22 minute period. The pressure kettle was maintained at 100° to 110° C. for about one hour and then the temperature was increased to 125° C. and held for an additional hour. The temperature was then increased gradually (over about a one hour period) to 150° C. and held there for nearly one hour. The pressure inside the kettle at this temperature was approximately 58 PSI. The reaction mixture was then cooled to about 100° C. over a 15 minute period and the kettle was opened. The product was a blackish-brown taffy-like solid. The solid product was ground with a pestle, washed repeatedly with hot water and then dried at about 50° C. to obtain a dry product. The product was identified by this layer chromatography as tris(4-anilinophenyl)-carbinol essentially free from aniline and undesirable contaminants.

EXAMPLE 6

A three liter, three neck flask equipped with stirrer, reflux condenser and heating mantle was charged with 1,750 milliliters water, 38.3 milliliters concentrated nitric acid (0.6 mole nitric acid) and 200 grams crude triphenylmethane compound. The crude triphenylmethane compound was approximately 85% tris(4-anilinophenyl)-carbinol, approximately 10% aniline and approximately 5% of other by-products and impurities such as sodium benzoate. The reaction mixture was heated to reflux and maintained at that temperature for approximately 16 hours. The reaction product was filtered while still hot and washed repeatedly with water until the wash liquors gave a neutral pH to pH paper. The 309 grams of wet press cake was dried at approximately 70° C. to yield approximately 191.2 grams of the dry, purified nitric acid salt. Analytical evaluation indicated less than 0.1% aniline in the purified salt.

The 191.2 grams of nitric acid salt, 800 milliliters of water and 35 grams 50% sodium hydroxide were charged into a reaction vessel fitted with stirrer, condenser and heating mantle. The mixture was stirred, heated to reflux and held at reflux temperatures for one hour. Eight hundred milliliters of toluene was carefully added and reflux continued for about six hours. An additional 2,000 milliliters of toluene was added and reflux continued for two additional hours.

The reaction mixture was cooled, filtered and the toluene layer separated by decantation and evaporated to dryness to yield a pure, dry sample of tris(4-anilinophenyl)-carbinol which could be used in carbonless paper formulations without premature color development or blushing.

EXAMPLE 7

This example shows the incorporation of the purified dye precursor in a CF coating. This method of producing carbonless copy paper is described, in general, in U.S. Pat. No. 4,226,442.

The coating for the CF sheet could be produced by the following recipe:

| Raw Materials | % |
| --- | --- |
| Methyl Ethyl Ketone | 63.28 |
| Polyvinyl Butyral | 4.0 |
| Potassium Hydroxide Flakes | 0.12 |
| Tamol 731 S.D. Dispersant | 0.2 |
| Titanium Dioxide | 5.0 |
| Calcium Carbonate | 25.0 |
| Methyl Ethyl Ketone | 10.0 |
| Dry tris(4-anilinophenyl)-carbinol | 2.4 |

| Raw Materials | % |
|---|---|
| Purified as Shown in Example 2 | | by the procedure of adding the methyl ethyl ketone, the polyvinylbutyral binder material, the disperant, and the potassium hydroxide with continuous agitation to dissolve such constituents in the solvent. After complete dissolution, the dry purified dye precursor is added with continuous stirring to dissolve the dye precursor and to obtain a uniform dispersion of it in the solution. To the above liquid mixture is then added the requisite amounts of the calcium carbonate-titanium dioxide opacifier-fillers. This addition should be accompanied by continuous stirring of the constituents in the liquid vehicle to obtain a uniform dispersion of the opacifier-filler therewithin.

The CF coating formula prepared as taught in this example can be drawn down onto a paper substrate using a wire wrapped draw down bar, and allowed to dry. This coated paper makes an excellent CF sheet for carbonless copy systems.

EXAMPLE 8

This example teaches a representative method which can be used to prepare a CB coating for carbonless copy paper. The CB coating on the rear of a sheet of paper which is to be placed in intimate contact with the CF coated paper may be of conventional character incorporating an electron accepting acid reacting material therein, as for example, of the type disclosed in the patents to Hoover (U.S. Pat. No. 3,787,325) and Brockett (U.S. Pat. No. 3,894,168).

A representative CB coating can be prepared by encapsulating a 17% solution of para-phenylphenol-formaldehyde resin in xylene with poly(vinyl alcohol) polymer film material which was made impervious by in situ treatment with resorcinol and formaldehyde as taught in British Pat. No. 1,190,720 issued May 6, 1970 to Bayless and Emric.

Thirty-eight grams of these capsules can be mixed with 16 grams of short alpha-cellulose floc fibers as capsule protectant material, along with 120 grams of 5% aqueous poly(vinyl alcohol), "Elvanol 71-30", as binder material and 112 grams of water to give a capsuler coating slurry which may be coated on paper. This coating can be applied to a paper substrate at about 4.5 pounds per ream to give the CB paper.

If the CF sheet of Example 7 is placed in contiguous interfacial relation to the CB sheet of Example 8, the application of pressure will rupture the coatings in the area of applied pressure to effect a release of the purified dye precursor and of the electron acceptor material to produce a distinct, blue colored image corresponding to the area of the applied pressure. Paper prepared in this manner shows very little tendency to "blush" in high humidity or at temperatures of about 125° F.

EXAMPLE 9

This example shows a representative method of manufacturing a black dye using the purified dye precursors of this invention.

A one liter, three neck flask fitted with stirrer, reflux condenser and heating mantle was charged with 5.32 grams of dry, purified tris(4-anilinophenyl)-carbenium chloride (prepared as described in the first paragraph of Example 2), 120 milliliters water and 1.03 grams of a 50% solution of sodium hydroxide. The mixture was stirred and heated to reflux and held at that temperature for approximately one hour. Sixty milliliters of toluene was added to the mixture and reflux continued for approximately six hours. An additional 160 milliliters of toluene was added and reflux continued for approximately one additional hour and the mixture was then allowed to cool to room temperature.

To this mixture was added 3.3 grams 50% sodium hydroxide and a slurry of 63 grams Basacryl Red GL (a red dye having Color Index Number 22460 manufactured by BASF) in 200 milliliters water. The mixture was heated to approximately 60° C. for about one half hour until the red color leaves the aqueous layer and the dye is extracted up into the toluene.

To this mixture was added a solution of 1.04 grams Calcozine Green MX concentrated crystals (Color Index Number 42000, Color Index name—Basic Green 4; manufactured by the American Cyanamid Company) in 20 milliliters water and 0.4 grams 50% sodium hydroxide. The mixture is stirred at about 60° C. until the green color leaves the aqueous layer and the green dye is extracted up into the toluene.

To this mixture was added a slurry of 1.04 grams Basic Yellow FFP (Basic Yellow 37, Color Index Number 41001, sold as Calcozine Yellow FW by the American Cyanamid Company) in 20 milliliters water and 0.4 grams 50% sodium hydroxide. After approximately one half hour stirring at 60° C. all of the yellow dye is extracted out of the water layer and up into the toluene solution.

An additional 93 milliliters of toluene was added and stirring maintained for a few minutes. The material was then filtered by gravity through 100 micron polyester filter cloth into a five liter separatory funnel. The lower aqueous layer was discarded, and the toluene layer containing the mixture of carbinol dyestuffs was filtered through fluted paper to produce a toluene solution of dye. The toluene was distilled away under vacuum to yield the dry, purified black dye mixture.

This black dye can be incorporated into a CF sheet as shown in Example 7 by substituting an equal weight of the dry black dye for the dry tris(4-anilinophenyl)-carbinol shown in Example 7. When the CF sheet is placed in contiguous interfacial relation to the CB sheet of Example 8, applied pressure will effect a release of the dye precursor and of the electron acceptor material to produce a distinct black image corresponding to the area of the applied pressure.

While this invention has been described by a number of specific embodiments, it is obvious that other variations and modifications may be made without departing from the spirit and scope of the invention as set forth in the appended claims.

The invention claimed is:

1. A process for purifying crude triphenylmethane compounds having unreacted aromatic amine associated therewith as an impurity or a solvent, wherein the triphenylmethane compound has the following structure:

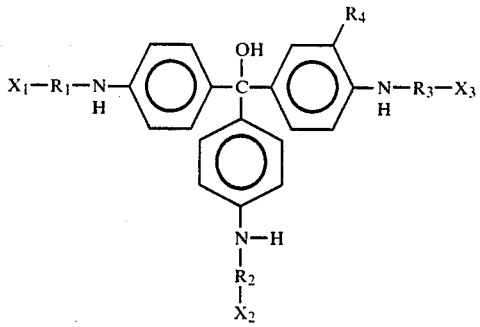

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage; and wherein said purification process comprises:

(1) heating the triphenylmethane compound in its carbinol form in the presence of aqueous acid at an effective temperature to form the acid salt; and (2) separating the salt from the aqueous acid solution; and (3) washing the salt with water to remove water-soluble impurities; and (4) heating the salt in the presence of an aqueous base at temperatures above about 100° C. and at pressures above atmospheric pressure to produce the triphenylmethane compound in its carbinol form; and (5) separating the triphenylmethane compound in its carbinol form from the aqueous base solution.

2. The process of claim 1 wherein the salt is heated in the presence of an aqueous base at temperatures ranging up to about 200° C. at pressures above atmospheric.

3. The process of claim 1 wherein the salt is heated in the presence of an aqueous base at temperatures between about 100° C. and 165° C. at pressures above atmospheric.

4. The process of claim 1 wherein the salt is heated in the presence of an aqueous base at temperatures above 100° C. and at pressures ranging up to about 150 psi.

5. The process of claim 1 further characterized in that the aqueous acid is an aqueous mineral acid.

6. The process of claim 5 wherein the mineral acid is hydrochloric acid.

7. The process of claim 5 wherein the mineral acid is nitric acid.

8. The process of claim 5 wherein the mineral acid is sulfuric acid.

9. The process of claim 1 further characterized in that the acid is present in an amount ranging from about 0.8 to about 3.0 equivalents of acid for each equivalent of triphenylmethane compound in its carbinol form.

10. The process of claim 1 further characterized in that the base is an alkali metal hydroxide.

11. The process of claim 10 further characterized in that the alkali metal hydroxide is sodium hydroxide.

12. The process of claim 10 further characterized in that the alkali metal hydroxide is potassium hydroxide.

13. The process of claim 1 further characterized in that the base is present in an amount of at least 0.8 equivalents of base for each equivalent of salt.

14. The process of claim 1 further characterized in that the base is present in an amount ranging from about 1.2 to about 3.0 equivalents of base for each equivalent of salt.

15. A process for purifying crude triphenylmethane compounds having unreacted aromatic amine associated therewith as an impurity or a solvent, wherein the triphenylmethane compound has the following structure:

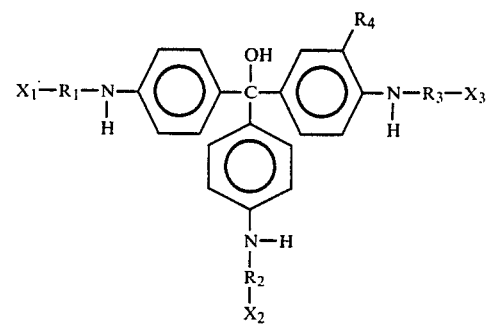

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage; and wherein said purification process comprises:

(1) heating the crude triphenylmethane compound in its carbinol form in the presence of aqueous acid at an effective temperature to form the acid salt; and (2) separating the salt from the aqueous acid solution; and (3) washing the salt with water to remove water-soluble impurities; and (4) heating the salt at an effective temperature in the presence of an aqueous base and an effective amount of an organic solvent capable of dissolving the triphenylmethane compound in its carbinol form as it is formed by the reaction of the base and the salt thereby producing a solvent solution of the purified triphenylmethane compound in its carbinol form; and (5) separating the solution of the purified triphenylmethane compound in its carbinol form from the aqueous base solution.

16. The process of claim 15 further characterized in that the aqueous acid is an aqueous mineral acid.

17. The process of claim 16 further characterized in that the aqueous mineral acid is selected from the group of acids consisting of hydrochloric acid, nitric acid, and sulfuric acid.

18. The process of claim 15 further characterized in that the acid is present in an amount ranging from about 0.8 to about 3.0 equivalents of acid for each equivalent of triphenylmethane compound in its carbinol form.

19. The process of claim 15 further characterized in that the base is an alkali metal hydroxide.

20. The process of claim 19 further characterized in that the alkali metal hydroxide is selected from the group consisting of sodium hydroxide and potassium hydroxide.

21. The process of claim 15 further characterized in that the base is present in an amount of at least 0.8 equivalents of base for each equivalent of salt.

22. The process of claim 15 further characterized in that the base is present in an amount ranging from about 1.2 to about 3.0 equivalents of base for each equivalent of salt.

23. The process of claim 15 further characterized in that the solvent is present in an amount ranging from about 1 to about 20 parts by weight solvent for each part salt.

24. The process of claim 15 further characterized in that the organic solvent is an aromatic hydrocarbon.

25. The process of claim 24 further characterized in that the aromatic hydrocarbon is selected from the group consisting of toluene and xylene.

26. The process of claim 15 further characterized in that the organic solvent is a ketone.

27. The process of claim 15 further characterized in that the organic solvent is an amine.

28. The process of claim 27 further characterized in that the amine is pyridine.

29. The process of claim 15 further characterized in that the temperature of step 1 ranges between about 75° C. and reflux.

30. The process of claim 15 further characterized in that the temperature of step 4 ranges between about 75° C. and reflux.

* * * * *